(12) United States Patent
Zhu et al.

(10) Patent No.: US 10,603,801 B2
(45) Date of Patent: Mar. 31, 2020

(54) PROTECTION APPARATUS, END EFFECTOR AND ROBOT

(71) Applicant: ABB Schweiz AG, Baden (CH)

(72) Inventors: Zhu Zhu, Shanghai (CN); Xiaodong Cao, Shanghai (CN); Yun Ha, Shanghai (CN); Kaiyuan Cao, Shanghai (CN)

(73) Assignee: ABB Schweiz AG, Baden (CH)

( * ) Notice: Subject to any disclaimer, the term of this patent is extended or adjusted under 35 U.S.C. 154(b) by 265 days.

(21) Appl. No.: 15/610,425

(22) Filed: May 31, 2017

(65) Prior Publication Data

US 2017/0266820 A1 Sep. 21, 2017

Related U.S. Application Data

(63) Continuation of application No. PCT/CN2014/092925, filed on Dec. 3, 2014.

(51) Int. Cl.
 *B25J 19/00* (2006.01)
 *F16J 15/3268* (2016.01)

(52) U.S. Cl.
 CPC ....... *B25J 19/0075* (2013.01); *F16J 15/3268* (2013.01)

(58) Field of Classification Search
 CPC ........ B25J 17/02; B25J 18/00; B25J 19/0075; B25J 19/06; F16J 15/002; F16J 15/32; F16J 15/3204; F16J 15/3268; F16J 15/3276
 See application file for complete search history.

(56) References Cited

U.S. PATENT DOCUMENTS

| 3,735,990 A | 5/1973 | Steegmuller |
| 7,878,088 B2 * | 2/2011 | Tamura ................ B25J 19/0075 277/353 |

(Continued)

FOREIGN PATENT DOCUMENTS

| CN | 201071902 Y | 6/2008 |
| CN | 101829996 A | 9/2010 |

(Continued)

OTHER PUBLICATIONS

Extended European Search Report, European Patent Application No. 14907544.2, dated Jun. 18, 2018, 9 pages.

(Continued)

*Primary Examiner* — Adam D Rogers
(74) *Attorney, Agent, or Firm* — Taft Stettinius & Hollister LLP; J. Bruce Schelkopf

(57) ABSTRACT

The present application discloses a protection apparatus. The protection apparatus is connected to an end effector which includes a casting, a fixed part fixed to the casting, a rotational part rotatable relative to the fixed part, and a sealing part provided in a circumference of the rotational part. The protection apparatus comprises a cover, an annular elastically deformable sealing member and a fixing member; the sealing member is partly accommodated between the cover and the rotational part; the cover is attached to the fixed part, the cover being adapted to cover the exterior of the fixed part by the fixing member, so as to prevent the fixed part from being exposed to an exterior; and the cover and the sealing member are configured to jointly cover the sealing part to prevent the sealing part from being exposed to an exterior. The present invention also provides an end effector and a robot.

22 Claims, 8 Drawing Sheets

(56) References Cited

U.S. PATENT DOCUMENTS

| | | | |
|---|---|---|---|
| 9,073,218 B2* | 7/2015 | Watanabe | B25J 19/0075 |
| 9,599,226 B2* | 3/2017 | Putkowski | F16J 15/064 |
| 10,011,026 B2* | 7/2018 | Okada | B25J 17/00 |
| 2002/0153664 A1* | 10/2002 | Schroeder | F16J 15/002 |
| | | | 277/551 |
| 2010/0224021 A1 | 9/2010 | Long et al. | |
| 2013/0255428 A1* | 10/2013 | Hahakura | B25J 18/00 |
| | | | 74/490.03 |
| 2014/0060236 A1 | 3/2014 | Watanabe | |
| 2016/0184986 A1* | 6/2016 | Procyshyn | B25J 9/0009 |
| | | | 74/490.05 |
| 2019/0337165 A1* | 11/2019 | He | B25J 17/00 |

FOREIGN PATENT DOCUMENTS

| | | | | |
|---|---|---|---|---|
| CN | 102478114 A | 5/2012 | | |
| CN | 202480101 U | 10/2012 | | |
| CN | 103659830 A | 3/2014 | | |
| DE | 102015209547 A1 * | 11/2016 | ......... | B25J 19/0029 |
| EP | 744252 A1 | 11/1996 | | |
| JP | 59190578 A * | 10/1984 | ............ | F16J 15/002 |
| JP | 2008073775 A | 4/2008 | | |
| JP | 2011245586 A | 12/2011 | | |
| JP | 2013072546 A | 4/2013 | | |
| JP | 5491281 B2 * | 5/2014 | | |

OTHER PUBLICATIONS

State Intellectual Property Office of P.R. China, International Search Report & Written Opinion issued in corresponding Application No. PCT/CN2014/092925, dated Jun. 17, 2015, 9 pp.

Chinese Office Action, dated Aug. 7, 2019, Chinese Patent Application No. 201480083571.4, 18 pages including English translation.

Chinese Search Report, dated Aug. 7, 2019, Chinese Patent Application No. 201480083571.4, 5 pages including English translation.

* cited by examiner

DETAIL B

PROTECTION APPARATUS, END EFFECTOR AND ROBOT

FIELD OF THE INVENTION

Embodiments of the present disclosure generally relate to a protection apparatus, and particularly relate to a protection apparatus for use in an end effector, and a robot comprising the end effector.

BACKGROUND OF THE INVENTION

As shown in FIG. 1, an end effector 16 is the closest part of the industrial robot 15 to the working environment. Usually, gaps are reserved at the exterior structure of the end effector 16 and enables pulverized oil mist or water enter into the inside of the end effector 16 during mechanical machining, so as to cause loss of precision or other damages to the end effector 16. Therefore, a protection apparatus is required for the end effector, which prevents sealability from excessively decreasing, as gear sealing damage may be caused as high pressure liquid and particles may enter into the end effector 16. Another potential problem is grease leakage for the gear sealing because grease might get out directly and pollute other tools or parts during mechanical machining.

For a conventional protection structure, as shown in FIG. 2, a double sealing is used to prevent grease leaking and liquid outside to avoid gear sealing damages. A first oil seal is arranged between a bearing inner ring and a bearing outer ring, and a second oil absorbing member is arranged so as to cover the outside end face of the oil seal. The second oil absorbing member is fitted by using a flexible belt-like holder and a belt-like binding band. The holder is wound around the bearing outer ring, the comb tooth plate parts are pressed to the end face of the second oil absorbing member and the holder is fastened onto the bearing outer ring by using the binding band. However, this structure is too complex and creates concave surface which is difficult for clean.

For this reason, there is a need in the art to develop an improved protection apparatus.

SUMMARY OF THE INVENTION

The object of the present invention is to provide a novel protection apparatus for protecting the end effector, and in particular, to protect gear sealing and prevent grease leaking.

According to one aspect of the invention, there is provided a protection apparatus. The protection apparatus is connected to an end effector which has a casting, a fixed part fixed to the casting, a rotational part rotatable relative to the fixed part, and a sealing part provided in a circumference of the rotational part. The protection apparatus comprises a cover, an annular elastically deformable sealing member and a fixing member; therein the sealing member is partly accommodated between the cover and the rotational part; the cover is attached to the fixed part, the cover being adapted to cover the exterior of the fixed part by the fixing member, so as to prevent the fixed part from being exposed to an exterior; and the cover and the sealing member are configured to jointly cover the sealing part so as to prevent the sealing part from being exposed to an exterior.

According to a preferred embodiment of the present invention, the sealing member is interposed between an outer ridge part of the cover and the sealing part.

According to a preferred embodiment of the present invention, one side of the sealing member is limited by the sealing part.

According to a preferred embodiment of the present invention, the sealing member is interposed between an outer ridge part and an inner ridge part of the cover.

According to a preferred embodiment of the present invention, one side of the sealing member is limited by the inner ridge part of the cover.

According to a preferred embodiment of the present invention, characterized in that, the cross section of the sealing member is structured in an O-shape.

According to a preferred embodiment of the present invention, characterized in that, the cross section of the sealing member is structured in a U-shape.

According to a preferred embodiment of the present invention, the open direction of the U-shaped sealing member is facing the interior or the exterior of the cover.

According to a preferred embodiment of the present invention, the cover is further provided with a chamfer adjacent to the inner surface of the sealing member, for the assembly of the sealing member.

According to a preferred embodiment of the present invention, the protection apparatus further comprises a second annular elastically deformable sealing member, interposed between an interior groove of the cover and the circumference of the U-shaped sealing member, to prevent the sealing member from moving.

According to a preferred embodiment of the present invention, the second sealing member is structured in an O-shape.

According to a preferred embodiment of the present invention, the sealing member is capable of moving along axially.

According to a preferred embodiment of the present invention, the fixing member comprises a plurality of screws, passing through the corresponding holes of the cover, so as to connect the cover with the fixed part.

According to a preferred embodiment of the present invention, the cover is further provided with a window to make a calibration mark visible, the calibration mark being graved or painted on the circumference or the chamfer of the rotational part.

According to a preferred embodiment of the present invention, the window is configured to be a calibration fixed mark.

According to a preferred embodiment of the present invention, the protection apparatus further comprises a third sealing member, interposed between the interior surface of the cover and the top surface of the bolts, to protect the concave of the blots, the bolts being configured to fix the fixed part to the casting.

According to a preferred embodiment of the present invention, the third sealing member is attached to the cover by an adhesive.

According to a preferred embodiment of the present invention, the protection apparatus further comprises sealing glue filled into the concave of the blots, interposed between the interior surface of the cover and the top surface of the bolts, to protect the concave of the blots, the bolts being configured to fix the fixed part to the casting.

According to a preferred embodiment of the present invention, the cover is further adapted to partially cover the circumference of the fixed part, and the protection apparatus further comprises a fourth annular elastically deformable sealing member, interposed between a second interior groove of the cover and the circumference of the fixed part.

According to a preferred embodiment of the present invention, the fourth sealing member is structured in an O-shape.

According to a preferred embodiment of the present invention, the cover is further adapted to partially cover the circumference of the fixed part, and the protection apparatus further comprises sealing glue, interposed between the cover and the circumference of the fixed part.

According to a preferred embodiment of the present invention, the sealing member is interposed between a second interior groove of the cover and the circumference of the fixed part.

According to a preferred embodiment of the present invention, the mounting surface of the rotational part is outside of the outer surface of the cover.

According to another aspect of the invention, there is provided an end effector comprising the protection apparatus as described above.

According to another aspect of the invention, there is provided a robot comprising the end effector as described above.

Compared with the existing prior arts, the protection solution for end effector can achieve several advantages as below.

Protect gear sealing: the present invention can prevent high press liquid and objects outside from damaging gear sealing.

Prevent grease get out directly: the present invention can prevent grease leaking from polluting tools or parts.

Compact structure: the present invention does not need long chamfer for assembly.

Easy for assembly: the present invention is easy to assemble the protection apparatus.

Other features and advantages of embodiments of the present application will also be understood from the following description of specific exemplary embodiments when read in conjunction with the accompanying drawings, which illustrate, by way of example, the principles of the invention.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

Throughout the figures, same or similar reference numbers indicate same or similar elements.

DETAILED DESCRIPTION OF PREFERRED EMBODIMENTS

Hereinafter, solutions as provided the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

In general, embodiments of the present application provide a new protection apparatus for an end effector of a robot. As will be apparent from the further discussions below, this structure can prevent liquid or particles from entering the inside of the end effector and also prevent the sealing part from being damaged, so as to maintain a sealing effect.

Throughout the descriptions of various embodiments of the present application, repeated descriptions of some similar elements will be omitted.

Figure 1:
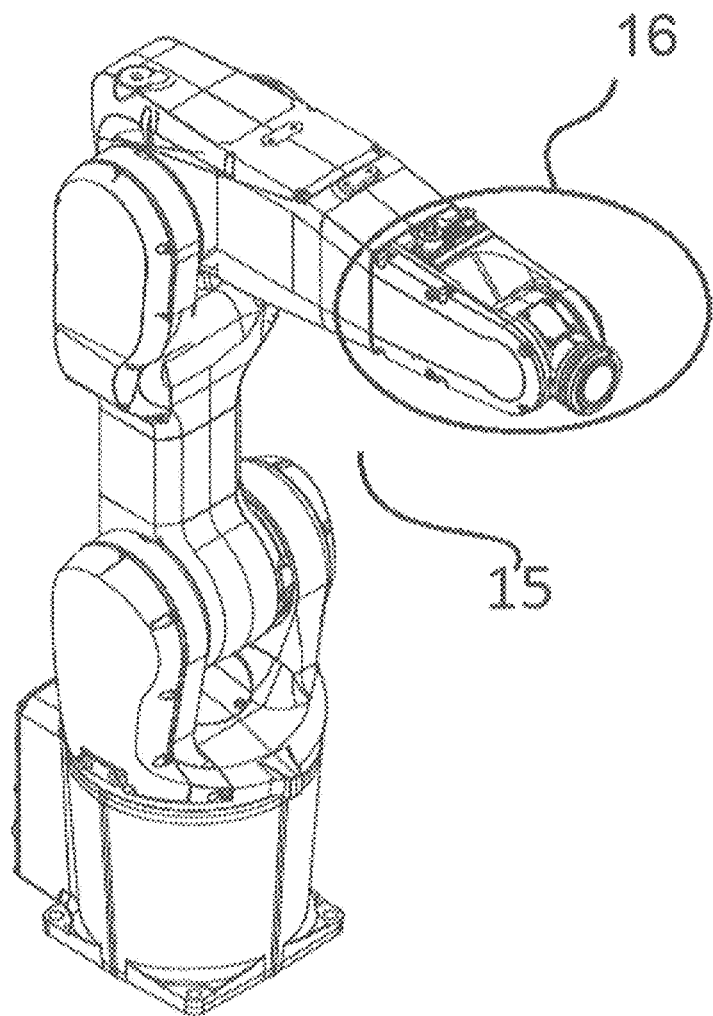
FIG. 1 shows a structure of an end effector in a robot.
Figure 2:
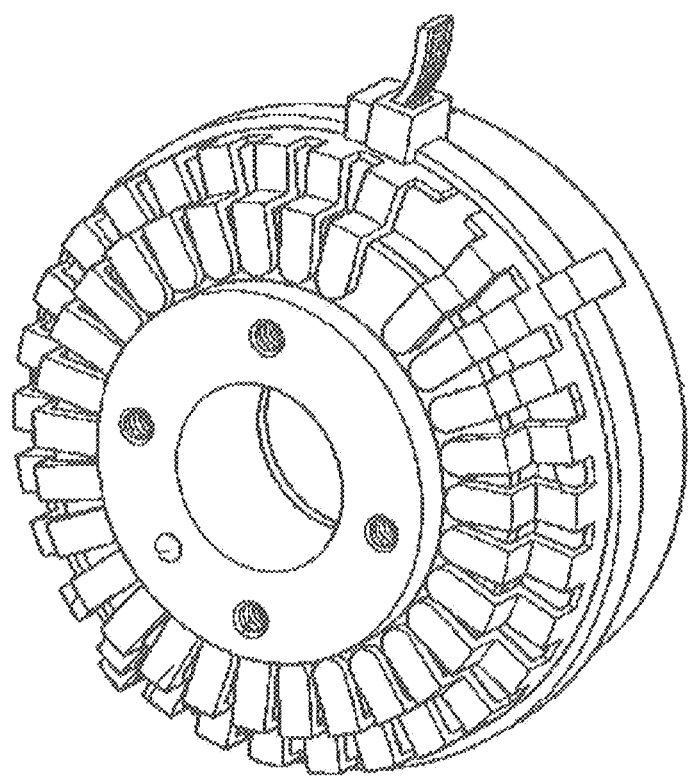
FIG. 2 shows a conventional structure of a protection apparatus for an end effector.
Figure 3:
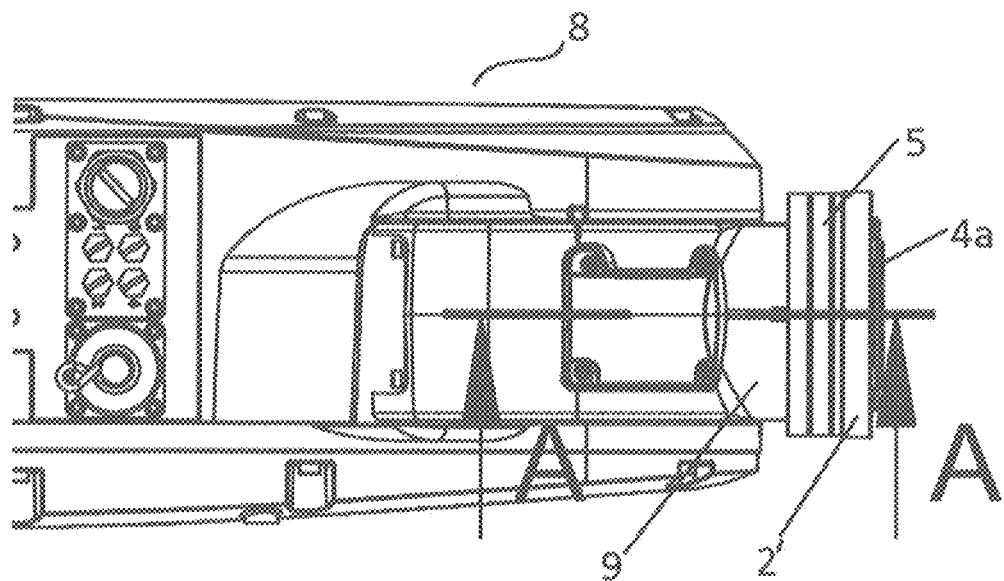
FIG. 3 shows a top view of the end effector according to an embodiment of the present disclosure.

Next, reference will be made to describe an example of the protection apparatus for the end effector of a robot in which the first embodiment of the present disclosure can be implemented. FIG. 3 is a top view schematically illustrating an exemplary end effector 8 to which the present invention can apply. The end effector 8 includes a fixed part 5 mounted on a casting 9 by means of bolts 6 which can be seen in FIG. 4, a rotational part 4 whose mounting surface is 4a rotatable relative to the fixed part 5, and a ring-like sealing part 1 provided in a circumference of the rotational part and between the fixed part 5 and the rotational part 4. The open direction 1a which can be seen in FIG. 6 of the sealing part 1 points the interior of the end effector 8 to prevent grease out. The sealing part 1 may be a known sealing element which provides dustproofing and/or waterproofing, without hindering rotation of the rotational part 5. The configuration and operation of such an end effector 8 is widely known in the art, and therefore a further description of which will be omitted herein.

Figure 4:
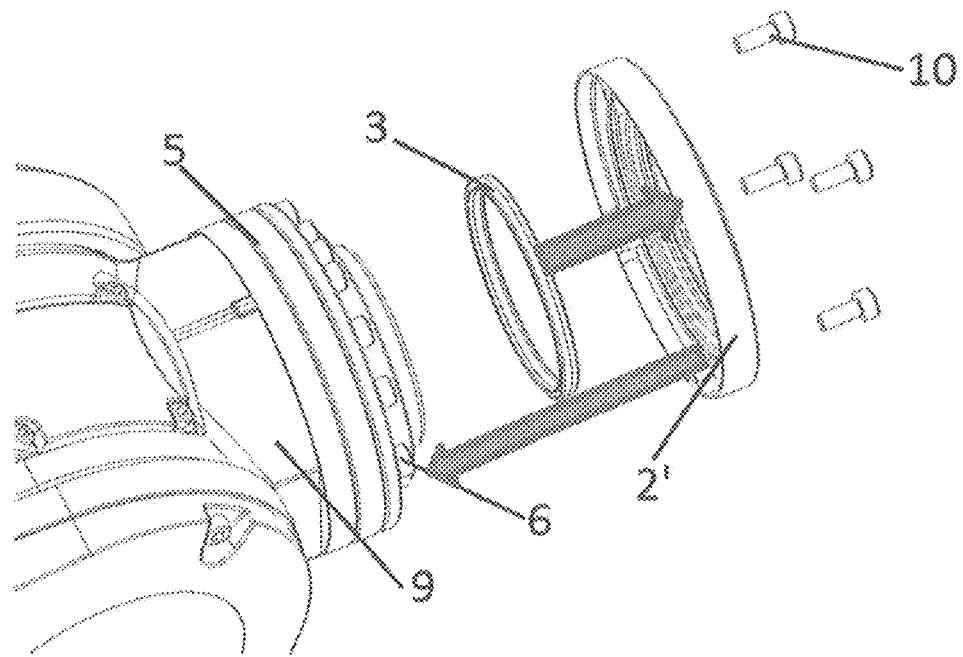
FIG. 4 shows an exploded perspective view of the protection apparatus according to an embodiment of the present disclosure.

As can be seen in FIG. 4, with a protection apparatus, it is advantageous that foreign objects can be prevented from being attached to the surface or even entering into the end effector 8. The protection apparatus comprises a cover 2', an annular sealing member 3 and a fixing member 10. The sealing member 3 may be elastically deformable. The fixing member 10 may be a plurality of screws 10, which pass through the corresponding holes 2'h of the cover 2', so as to connect the cover 2' with the fixed part 5.

The assembly sequence may be firstly installing the sealing member 3 into the cover 2' from the inside, so it does not need long chamfer for assembly. Then we can fix the cover 2' onto the fixed part 5 by screws 10; finally fix the fixed part 5 onto the casting 9 by blots 6. So it is easy for assembly.

Figure 5:
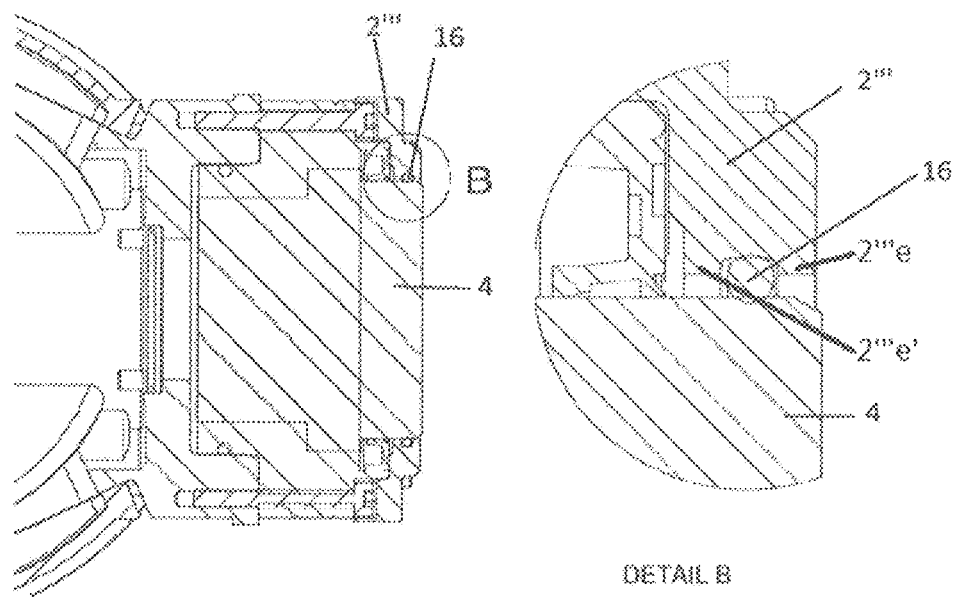
FIG. 5 shows a section view of the protection apparatus according to a second embodiment of the present disclosure.

As shown in FIG. 5, an O-ring 16 can be acting as the sealing member 3. With an inner ridge part 2'''e' and an outer ridge part 2'''e of the cover 2''', the O-ring 16 can be limited by the inner ridge part 2'''e' and the outer ridge part 2'''e. The sealing member 16 is allowed to move along axially, or remain fixed.

Therefore, as described above, the exterior of the fixed part 5 can be covered by the cover, to prevent it from being exposed to the exterior.

Further, the sealing part 1 is also covered by the cover and the sealing member. Thus, the sealing part 1 can also be prevented from being directly exposed to the exterior.

With reference to above embodiment, the protection apparatus used for the end effector can prevent high press liquid and objects outside from damaging gear sealing, and also prevent grease leaking from polluting tools or parts with compact structure.

The above describes one kind of sealing, but its structure is not limited to the above, and it can also adopt, but not limited to, other structures as described below.

Figure 6:
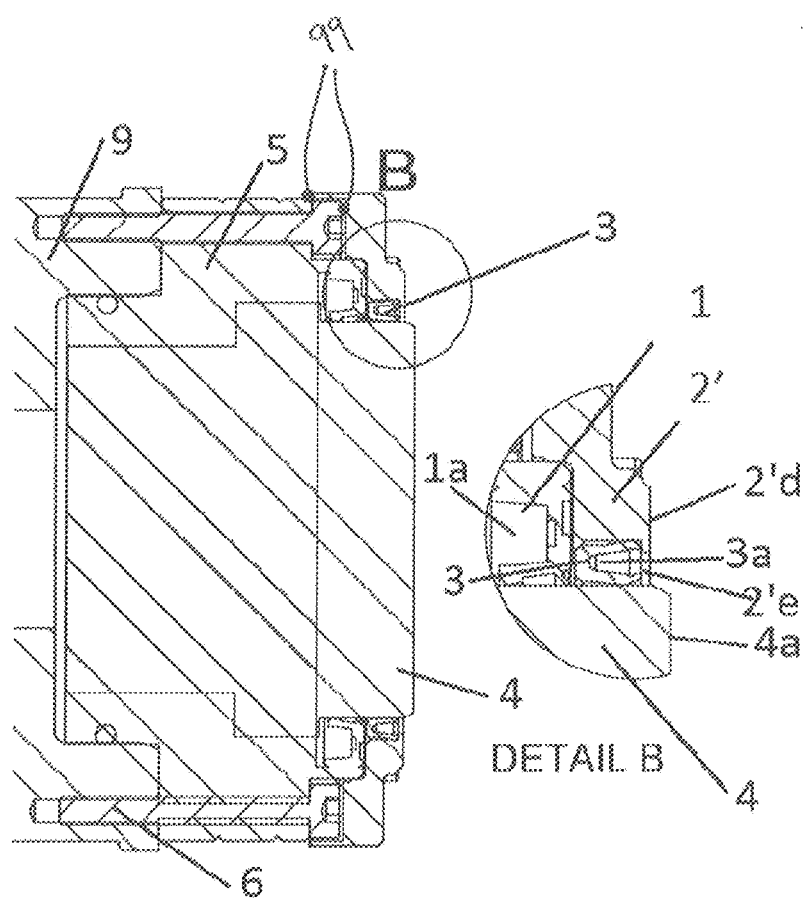
FIG. 6 shows a section view of the protection apparatus according to a third embodiment of the present disclosure.

For example, in another embodiment of the present application, a U-shaped ring 3 can be acting as the sealing member, and its open direction 3a may be facing the exterior of the cover 2', as shown in FIG. 6, to prevent objects from outside.

Figure 8:
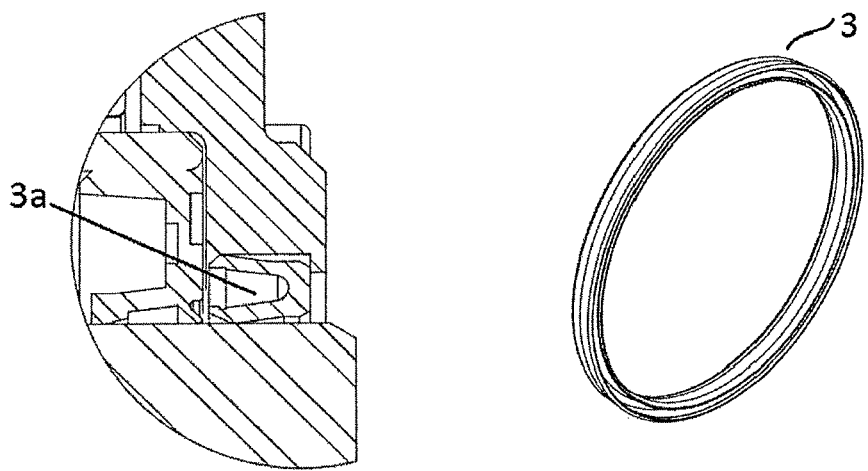
FIG. 8 shows a partially enlarged view of the protection apparatus according to a fourth embodiment of the present disclosure.

It should also be appreciated that the open direction 3a of the sealing member 3 can also be facing the interior of the cover 2' as shown in FIG. 8.

According to another embodiment of the present embodiment, as shown in FIG. 6, the outer ridge part 2'e is used for holding the sealing member 3 to prevent the sealing member 3 out. Back side 3b of the sealing member 3 can be limited by the sealing part 1 (as also shown in FIG. 9).

Figure 7:
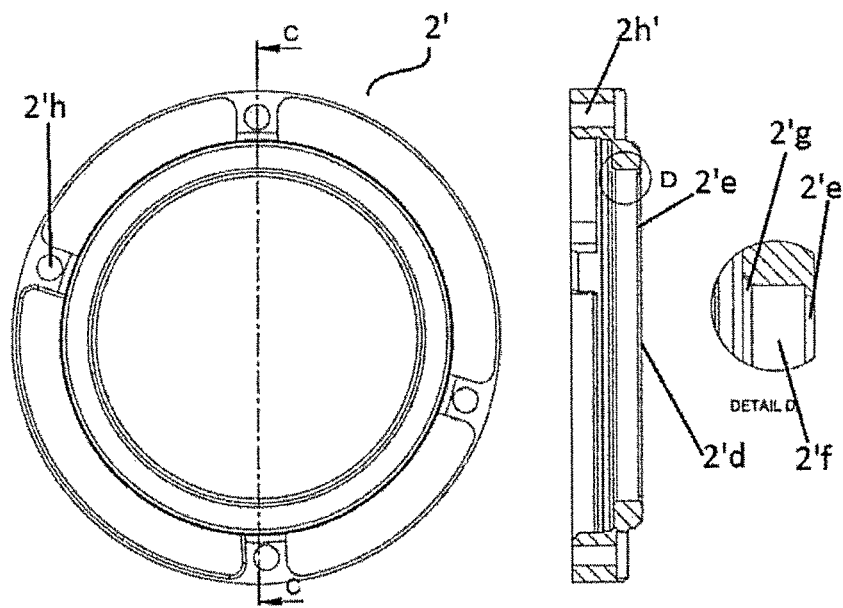
FIG. 7 shows a part section view of the protection apparatus according to a third embodiment of the present disclosure.

With reference to FIGS. 6-7, the mounting surface 4a of the rotational part 4 is outside of the surface 2'd of the cover 2', since the chamfer for sealing assembly is not required. So it is compact and good for designing tools.

Another embodiment of the present application, as shown in FIG. 7, a chamfer 2'g, which is adjacent to the inner surface of the sealing member 3, can be used for assembling the sealing member 3 to the cover 2'. The space 2'f can be used to receive the sealing member 3.

Figure 9:
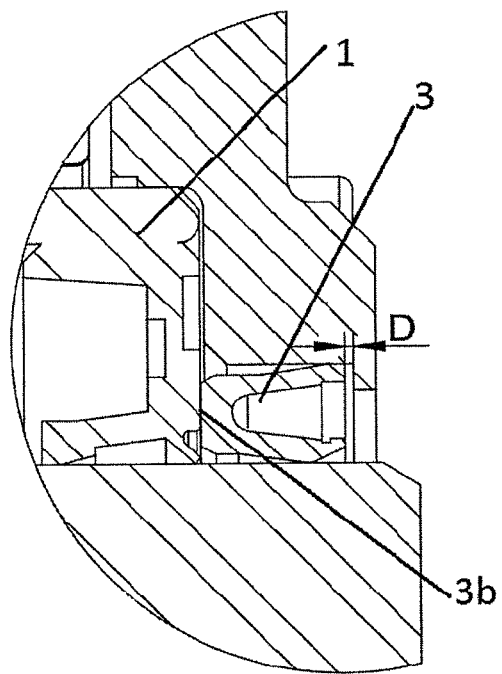
FIG. 9 shows a partially enlarged view of the protection apparatus according to a fifth embodiment of the present disclosure.

With reference to FIG. 9, the sealing member 3 can be allowed to move along axially, as there is a gap D.

Figure 11:
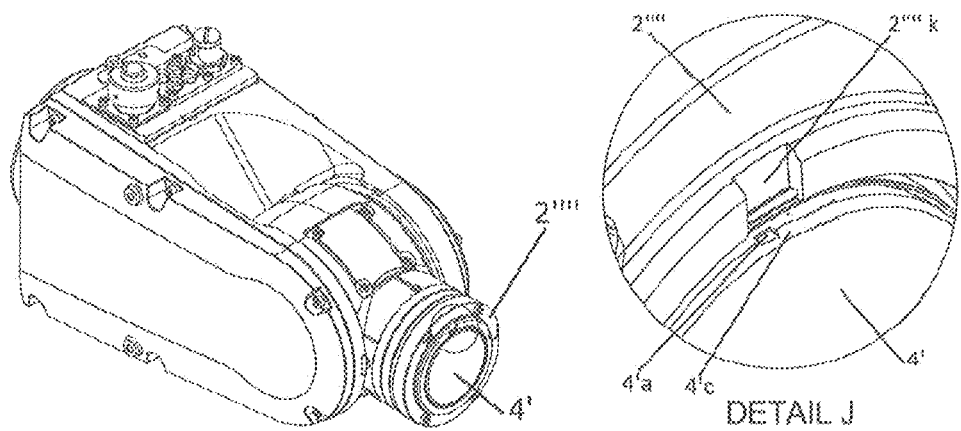
FIG. 11 shows a section view of the protection apparatus according to a seventh embodiment of the present disclosure.

Another embodiment of the present application will be further discussed below. As shown in FIG. 11, the rotational part 4' has a mark 4'a for calibration and the mark can be graved or painted on the circumference or the chamfer 4'c of the rotational part 4'. According to this structure, a concave or a window 2''''k can be set on the cover 2'''' to make the calibration mark 4'a visible and it may also be a calibration fixed mark.

The above describes one kind of protection apparatus with different sealing structures, but the structures are not limited to the above, and it can also adopt, but not limited to, other structures as described below. The below structures can better prevent liquid or particles from entering the inside of the end effector and also prevent the sealing part from being damaged. Furthermore, the following structures can better prevent grease leaking from polluting tools or parts.

Figure 10:
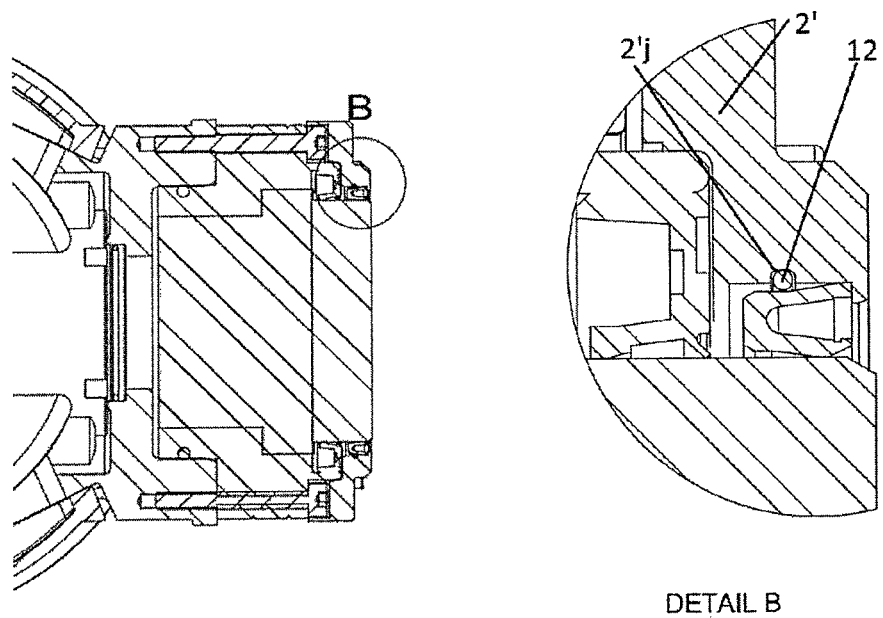
FIG. 10 shows a section view of the protection apparatus according to a sixth embodiment of the present disclosure.

For example, in another embodiment of the present application, a deformable material 12 can be added to prevent the sealing member 3 from moving, as shown in FIG. 10. The deformable material 12 can be interposed between an interior groove 2'j of the cover 2' and the circumference of the U-shaped sealing member 3. Especially, its shape may be a ring.

Figure 12:
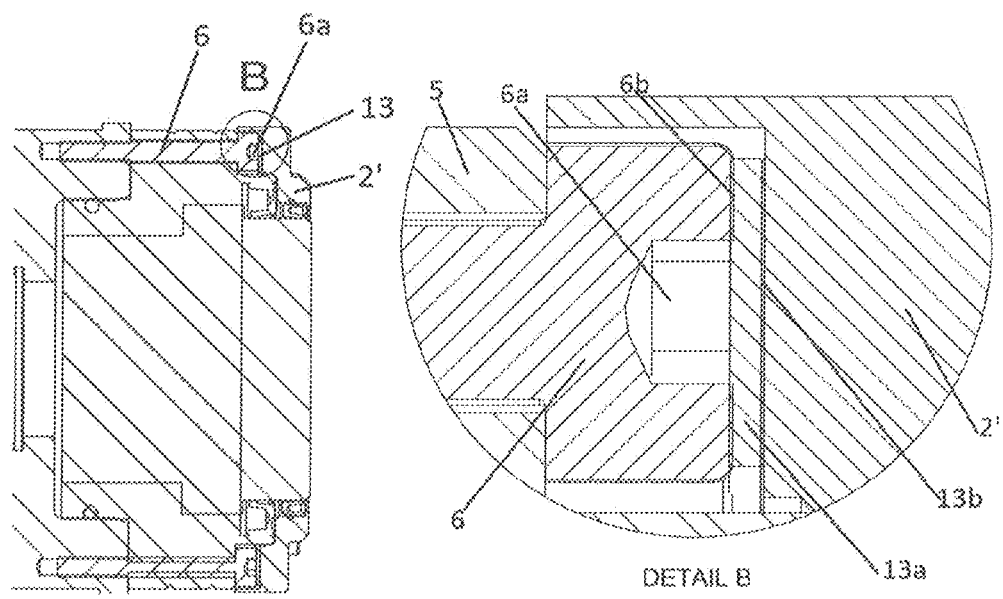
FIG. 12 shows a section view of the protection apparatus according to an eighth embodiment of the present disclosure.
Figure 13:
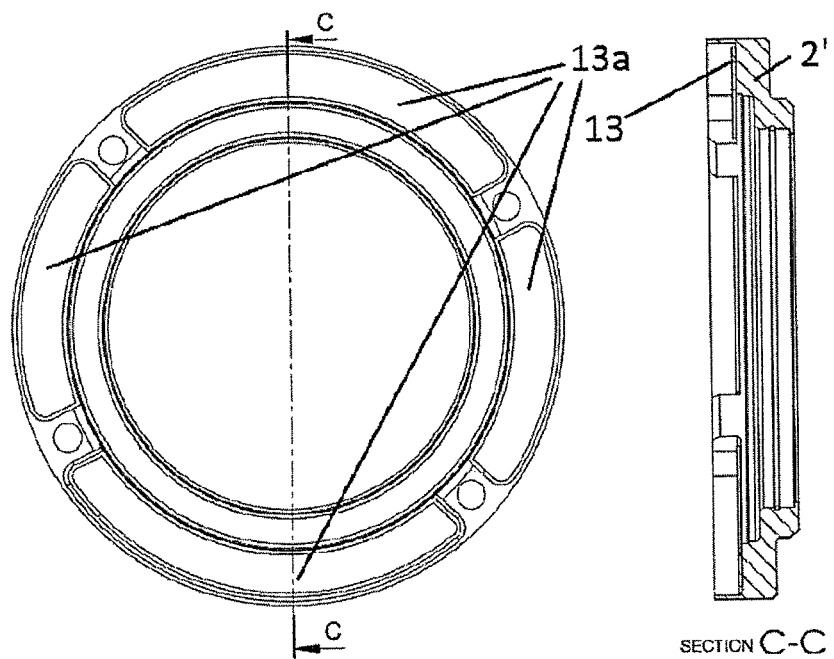
FIG. 13 shows a part section view of the protection apparatus according to an eighth embodiment of the present disclosure.

Another embodiment of the present application, with reference to FIGS. 12-13, a sealing material 13a can be attached to the interior surface of the cover 2' by an adhesive 13b or other means. The bolt top surface 6b of bolts 6 can be covered by the sealing material 13a. So the sealing material 13a can prevent water into the concave 6a of the bolts 6.

Another solution to protect the concave 6 a of the bolts 6 is fill some sealing glue in concave 6 a, interposed between the interior surface of the cover 2' and the top surface 6 b of the bolts 6. So the sealing glue can also prevent rust. Example locations of glue 99 are shown in FIG. 6.

Figure 14:
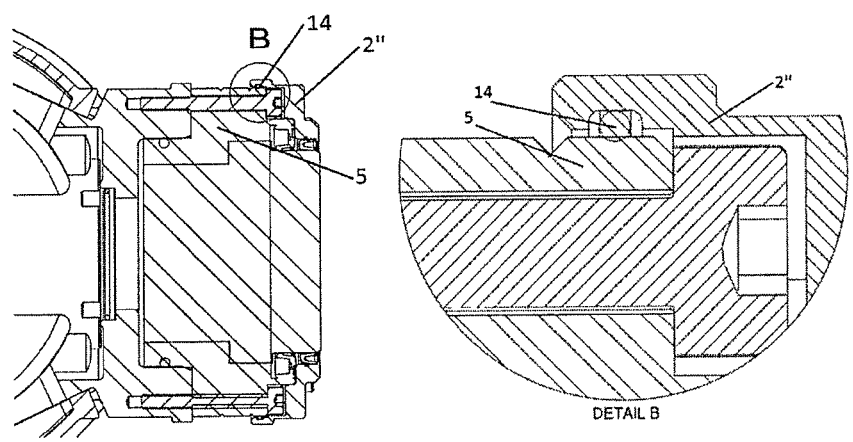
FIG. 14 shows a section view of the protection apparatus according to a ninth embodiment of the present disclosure.

According to another embodiment of the present embodiment, as shown in FIG. 14, a sealing 14 can be put outside of the fixed part 5 for sealing in the radial direction. The sealing 14 can be an elastically deformable O-ring, glue or has other structure. The cover 2'' may further have an interior groove to hold the sealing 14. In this way water can also be prevented from getting inside the cover.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A protection apparatus that is connected to an end effector which has a casting, a fixed part fixed to the casting, a rotational part rotatable relative to the fixed part, and a sealing part provided on a circumference of the rotational part, the protection apparatus comprises:
   a cover, an annular elastically deformable sealing member and a fixing member;
   the sealing member is partly accommodated between the cover and the rotational part;
   the cover is attached to the fixed part, the cover adapted to cover an interior of the fixed part by the fixing member to prevent the interior of the fixed part from being exposed to an exterior of the fixed part; and
   the cover and the sealing member are configured to jointly cover the sealing part to prevent the sealing part from being exposed to an exterior environment;
   wherein the sealing member is interposed between an outer ridge part of the cover and the sealing part; and
   wherein one side of the sealing member is limited by the sealing part.

2. The protection apparatus according to claim 1, wherein the cross section of the sealing member is structured in a U-shape.

3. The protection apparatus according to claim 2, wherein an open direction of the U-shaped sealing member is facing the interior or the exterior of the cover.

4. The protection apparatus according to claim 2, wherein the cover further includes a chamfer adjacent to an inner surface of the sealing member, the chamfer structured to aid in the coupling of the sealing member with the cover.

5. The protection apparatus according to claim 4, wherein a second sealing member is structured in an O-shape.

6. The protection apparatus according to claim 2, wherein the protection apparatus further comprises a second annular elastically deformable sealing member, interposed between an interior groove of the cover and a circumference of the U-shaped sealing member, to prevent the annular elastically deformable sealing member from moving.

7. The protection apparatus according to claim 1, wherein the sealing member is capable of moving axially.

8. The protection apparatus according to claim 1, wherein the fixing member comprises a plurality of screws, passing through corresponding holes of the cover to connect the cover with the fixed part.

9. The protection apparatus according to claim 1, wherein the cover further includes a window to make a calibration mark visible, the calibration mark being engraved or painted on the circumference or a chamfer of the rotational part.

10. The protection apparatus according to claim 9, wherein the window is configured to be a calibration fixed mark.

11. The protection apparatus according to claim 1, wherein the fixing member comprises a plurality of bolts, and wherein the protection apparatus further comprises another sealing member, interposed between an interior surface of the cover and a top surface of the plurality of bolts, to protect a concave of the plurality of bolts, the plurality of bolts configured to fix the fixed part to the casting.

12. The protection apparatus according to claim 11, wherein the another sealing member is attached to the cover by an adhesive.

13. The protection apparatus according to claim 1, wherein the fixing member comprises a plurality of bolts, and wherein the protection apparatus further comprises sealing glue filled into a concave of the plurality of bolts, interposed between an interior surface of the cover and a top surface of the plurality of bolts, to protect the concave of the plurality of bolts, the plurality of bolts configured to fix the fixed part to the casting.

14. The protection apparatus according to claim 1, wherein the cover is further adapted to partially cover a circumference of the fixed part, and the protection apparatus further comprises an annular elastically deformable sealing member, interposed between an interior groove of the cover and the circumference of the fixed part.

15. The protection apparatus according to claim 14, wherein the annular elastically deformable sealing member is structured in an O-shape.

16. The protection apparatus according to claim 1, wherein the cover is further adapted to partially cover a circumference of the fixed part, and the protection apparatus further comprises sealing glue, interposed between the cover and the circumference of the fixed part.

17. The protection apparatus according to claim 16, wherein the sealing member is interposed between an interior groove of the cover and the circumference of the fixed part.

18. The protection apparatus according to claim 1, wherein a mounting surface of the rotational part is outside of an outer surface of the cover.

19. An end effector comprising the protection apparatus according to claim 1.

20. A robot comprising:
   an end effector including a casting, a fixed part fixed to the casting, a rotational part rotatable relative to the fixed part, and a sealing part disposed on a circumference of the rotational part; and
   a protection apparatus that is connected to the end effector, the protection apparatus comprises:
   a cover, an annular elastically deformable sealing member and a fixing member, the cover comprising a recess with an opening on one axial side and an outer ridge part enclosing the recess at an opposite axial side;
   the sealing member is partly accommodated between the cover and the rotational part, the sealing member being disposed within the recess of the cover;
   the cover is attached to the fixed part, the cover adapted to cover an interior of the fixed part by the fixing member to prevent the interior of the fixed part from being exposed to an exterior of the fixed part; and
   the cover and the sealing member are configured to jointly cover in an axial direction the sealing part to prevent the sealing part from being exposed to an exterior environment;
   wherein the sealing member is interposed between the outer ridge part of the cover and the sealing part, the opening of the recess being enclosed by the sealing part to trap the sealing member between the outer ridge part and the sealing part.

21. The protection apparatus according to claim 20, wherein the cross section of the sealing member is structured in a U-shape.

22. The protection apparatus according to claim 21, wherein an open direction of the U-shaped sealing member is facing the interior or the exterior of the cover.

\* \* \* \* \*